United States Patent [19]
Decor et al.

[11] 3,904,665
[45] Sept. 9, 1975

[54] 1-ISOCYANATO-2-ISOCYANATOMETHYL-CYCLOPENTANE

[75] Inventors: Jean-Pierre Decor; Jean Goletto, both of Rhone, France

[73] Assignee: Rhone-Poulenc S.A., Paris, France

[22] Filed: Oct. 19, 1973

[21] Appl. No.: 408,047

[30] Foreign Application Priority Data
Oct. 23, 1972  France .............................. 72.37512

[52] U.S. Cl... 260/453 A; 260/75 AT; 260/775 AT; 260/464; 260/465.8 R; 260/482 B; 260/563 R
[51] Int. Cl.² ..................................... C07C 119/045
[58] Field of Search ................................ 260/453 A

[56] References Cited
UNITED STATES PATENTS
2,953,590   9/1960   Pfirschke ............................ 260/453
3,232,973   2/1966   Bayer et al .......................... 260/453
3,401,190   9/1968   Schmitt et al ........................ 260/453

Primary Examiner—Elbert L. Roberts
Assistant Examiner—Dolph H. Torrence
Attorney, Agent, or Firm—Cushman, Darby & Cushman

[57] ABSTRACT

The invention provides 1-isocyanato-2-isocyanatomethyl-cyclopentane which is a valuable starting material for the manufacture of polyurethanes, especially polyurethane lacquers.

1 Claim, No Drawings

1-ISOCYANATO-2-ISOCYANATOMETHYL-CYCLOPENTANE

The present invention provides 1-isocyanato-2-isocyanatomethyl-cyclopentane.

1-Isocyanato-2-isocyanatomethyl-cyclopentane is an asymmetric cycloaliphatic diisocyanate which can be obtained from 2-aminomethyl-cyclopentylamine by any known method which makes it possible to convert an amine into the corresponding isocyanate. These methods consist in particular of reacting phosgene with the diamine either in the free state or in the combined state in the form of the carbamate or of the amine hydrochloride.

2-Aminomethyl-cyclopentylamine is generally obtained by hydrogenation of iminocyanocyclopentane. It is known that iminocyanocyclopentane is a by-product from the preparation of adiponitrile [see, for example, M. Lamant, Annales de Chimie, p. 87–143 (1959)]. Consequently, 1-isocyanato-2-isocyanatomethyl-cyclopentane can be produced under particularly advantageous economic conditions from the by-product from the preparation of adiponitrile.

1-Isocyanato-2-isocyanatomethyl-cyclopentane is advantageously prepared from carbamates of 2-aminomethyl-cyclopentylamine. Carbon dioxide is first of all reacted with the diamine, preferably in the dissolved state, and at a temperature which is advantageously between 0° and 100°C. Aliphatic, cycloaliphatic and aromatic hydrocarbons, which may or may not be halogenated, as well as organic esters are suitable solvents. Typical examples include toluene, diisopropylbenzene, isobutyl isobutyrate and o-dichlorobenzene, especially the last. The carbamates of 2-amino-methyl-cyclopentylamine, which generally consist of a mixture of mono- and di-carbamates in varying proportions, are then subjected to the action of phosgene. The phosgenation is advantageously carried out in two stages. During the first stage, the reaction temperature is kept between 0° and 30°C so as to form the corresponding carbamyl chlorides. During the second stage, the carbamyl chlorides are thermally decomposed, above 100°C into 1-isocyanato-2-isocyanatomethyl-cyclopentane. In order to improve the yields, it is possible to carry out the second stage under a gentle stream of phosgene. The process is advantageously carried out in one of the solvents described above. 1-Isocyanato-2-isocyanatomethyl-cyclopentane can be purified easily by simple distillation.

1-Isocyanato-2-isocyanatomethyl-cyclopentane is an asymmetric cycloaliphatic diisocyanate, the two isocyanate groups of which are of different reactivity. As a result of this, during the preparation of a prepolymer of polyurethanes possessing terminal isocyanate groups, the ratio of isocyanate groups to hydroxyl groups being between 1 and 2, practically all the molecules of 1-isocyanato-2-isocyanatomethyl-cyclopentane are chemically bonded to the prepolymer via their more reactive isocyanate group. In other words, the prepolymers of polyurethanes possessing terminal isocyanate groups prepared from 1-isocyanato-2-isocyanatomethyl-cyclopentane do not contain any volatile isocyanates. Thus, they do not present the danger to the respiratory tracts that polyurethane prepolymers prepared from hexamethylene-diisocyanate do.

The polyurethane prepolymers possessing terminal isocyanate groups, produced from 1-isocyanato-2-isocyanato-methyl-cyclopentane, can be used in a number of ways. They lead, in particular, to the production of flexible or rigid lacquers which can be cured in the moisture of the atmosphere (single-component formulation) or by coupling at the time of use with a polyhydroxylic polyester (two component formulation). These lacquers have satisfactory light resistance and have a particularly short drying time.

The following Examples further illustrate the present invention. Temperatures are in degrees Centigrade.

EXAMPLE 1

200 g of phosgene are introduced over 2 hours at 0° into a flask containing 700 g of o-dichlorobenzene and 57 g of 2-aminomethyl-cyclopentylamine in the form of the carbamate (prepared as indicated below); the reaction mixture is then allowed to return to ambient temperature. The mixture is then heated at 80° for 1 hour 30 minutes and the temperature raised gradually to 125° and this temperature is maintained for 15 hours whilst a gentle stream of phosgene (flow rate: 34 g/hour) is passed continuously. After cooling and distilling, 39 g of 1-isocyanato-2-isocyanatomethyl-cyclopentane are obtained, the properties of which are as follows:

Boiling point $_{0.25}$: 68.4°– 68.6° and $n_D^{20}$: 1.480.

The purity of the product was confirmed by mass spectrography, elementary microanalysis and gas phase chromatography.

The solution of 2-aminomethyl-cyclopentylamine carbamate was produced by bubbling carbon dioxide for 2 hours into a solution of 57 g of diamine in 700 g of o-dichlorobenzene. Whilst the carbon dioxide was being passed, the temperature of the reaction mixture rose from 20° to 80°, and was then maintained at this temperature.

The 1-isocyanato-2-isocyanatomethyl-cyclopentane was used to produce polyurethane lacquer by the following procedure:

10 g of trimethylolpropane and 30 g of ethyl glycol acetate are placed in a flask which has been purged with nitrogen and heated to 80°; 37.25 g of 1-isocyanato-2-isocyanatomethyl-cyclopentane are then introduced at this temperature. The mixture is rendered homogeneous for 30 minutes and is then diluted with 17.25 g of ethyl glycol acetate and rendered homogeneous again at 80° for 2 hours 30 minutes. A pale yellow fluid solution is thus obtained which contains approximately 0.238 isocyanate group in 100 g of solution.

A solution with a 50% solids content in ethyl glycol acetate is then prepared by dissolving, in the solvent, a trimethylolpropane orthophthalate containing 0.468 hydroxyl group in 100 g of polyester.

A polyurethane lacquer is prepared by mixing equal weights of the 2 solutions of isocyanate and polyester described above. Films of approximately 100 microns thickness are poured on glass; the drying times at 23° are as follows:

Dust-dry time: 35 minutes and
Touch-dry time: 1 hour 10 minutes.

EXAMPLE 2

A solution of 2-aminomethyl-cyclopentylamine dihydrochloride is prepared by bubbling gaseous hydrogen chloride into a solution containing 57 g of 2-aminomethyl-cyclopentylamine and 700 g of o- dichlorobenzene. When saturation is complete, the unreacted hydrogen chloride is removed by means of a stream of nitrogen.

A stream of phosgene (60 g/hour) is then passed into the flask whilst the temperature is raised to 134°. This temperature is maintained and phosgene is bubbled through for 20 hours. After cooling and distillation, 33 g of 1-isocyanato-2-isocyanatomethyl-cyclopentane are obtained.

EXAMPLE 3

A solution consisting of 57 g of 2-aminomethyl-cyclopentylamine and 300 g of o-dichlorobenzene is added dropwise, over the course of 1 hour 30 minutes, into a flask containing 400 g of o-dichlorobenzene and 200 g of phosgene kept at about 0°. The temperature is allowed to rise and the mixture is then heated gradually for 2 hours to 140° under a stream of phosgene (40 g/hour). After cooling and distillation, 23.8 g of 1-isocyanato-2-isocyanato-methyl-cyclopentane are obtained.

Boiling point $_{1.5}$ : 96°–98°.

EXAMPLE 4

The procedures described in Examples 1 and 2 are repeated but the nature of the solvent was varied and the process was carried out either starting from the carbamate or starting from the hydrochloride of 2-aminomethyl-cylcopentylamine. The results obtained are as follows:

| Nature of the solvent | Reagent used | % yield of 1-isocyanato-2-isocyanato-methyl-cyclo-pentane |
|---|---|---|
| Isobutyl Isobutyrate | Hydrochloride | 20 |
| Isobutyl Isobutyrate | Carbamate | 28.4 |
| Di-isopropyl-benzene | Hydrochloride | 24 |
| Tetralin | Hydrochloride | 40 |

We claim:
1. 1-Isocyanato-2-isocyanatomethyl-cyclopentane.

* * * * *